United States Patent [19]

Kuntz

[11] Patent Number: 5,676,834
[45] Date of Patent: *Oct. 14, 1997

[54] UPFLOW CLARIFIER

[75] Inventor: James Kuntz, Spokane, Wash.

[73] Assignee: Spokane Industries, Inc., Spokane, Wash.

[*] Notice: The term of this patent shall not extend beyond the expiration date of Pat. No. 5,569,381.

[21] Appl. No.: 713,113

[22] Filed: Sep. 16, 1996

Related U.S. Application Data

[63] Continuation of Ser. No. 448,653, May 24, 1995, Pat. No. 5,569,381.

[51] Int. Cl.$^6$ .............................. B01D 63/00; B01D 12/00
[52] U.S. Cl. .......................... 210/321.6; 210/321.72; 210/321.79; 210/323.2; 210/521; 210/299; 210/295
[58] Field of Search .................. 210/321.6, 321.72, 210/321.79, 321.75, 323.2, 521, 299, 295, 305, 306, 320, 307, 513

[56] References Cited

U.S. PATENT DOCUMENTS

| | | | |
|---|---|---|---|
| 2,390,494 | 12/1945 | Briggs et al. | 210/184 |
| 2,693,882 | 11/1954 | Olson et al. | 210/184 |
| 3,168,469 | 2/1965 | Abdalian et al. | 210/333.01 |
| 4,017,397 | 4/1977 | Copeland | 210/238 |
| 4,043,917 | 8/1977 | Rowley et al. | 210/323 T |
| 4,243,533 | 1/1981 | Savolainen et al. | 210/247 |
| 4,405,466 | 9/1983 | Giannelli et al. | 210/798 |
| 4,421,170 | 12/1983 | Swift, Jr. et al. | 166/312 |
| 4,525,274 | 6/1985 | Willus et al. | 210/232 |
| 4,560,483 | 12/1985 | Warning et al. | 210/777 |
| 4,582,603 | 4/1986 | Nasse | 210/323.2 |
| 4,683,057 | 7/1987 | Krause et al. | 210/323.2 |
| 4,704,210 | 11/1987 | Boze et al. | 210/778 |
| 4,713,174 | 12/1987 | Zievers et al. | 210/233 |
| 4,744,900 | 5/1988 | Bratt | 210/321.78 |
| 4,802,978 | 2/1989 | Schmit et al. | 210/104 |
| 4,828,717 | 5/1989 | DeLeeuw et al. | 210/740 |
| 4,855,065 | 8/1989 | Keeter et al. | 210/776 |
| 4,904,384 | 2/1990 | Potz | 210/309 |
| 5,096,583 | 3/1992 | Roux et al. | 210/321.6 |
| 5,160,428 | 11/1992 | Kuri | 210/107 |
| 5,238,563 | 8/1993 | Smith, Jr. et al. | 210/321.74 |
| 5,277,806 | 1/1994 | Kuntz | 210/321.72 |
| 5,279,733 | 1/1994 | Heymans | 210/323.2 |
| 5,437,788 | 8/1995 | Geibel et al. | 210/323.2 |
| 5,443,724 | 8/1995 | Williamson et al. | 210/323.2 |
| 5,518,609 | 5/1996 | Karlsson | 210/323.2 |
| 5,569,381 | 10/1996 | Kuntz | 210/321.6 |

*Primary Examiner*—Ana Fortuna
*Attorney, Agent, or Firm*—Wells, St. John, Roberts, Gregory & Matkin, P.S.

[57] ABSTRACT

An upflow clarifier comprises an enclosure defining a bounded volume for holding liquid. An inlet is coupled to the enclosure, and an outlet is coupled to the enclosure above the inlet. A barrier is provided in the enclosure, between the inlet and the outlet. The barrier has a plurality of apertures therethrough, and the barrier defines an upper compartment above the barrier and a lower compartment below the barrier. A plurality of filter membranes are respectively mounted to the apertures, wherein liquid flowing through the apertures flows through the filter membranes. The filter membranes extend upwardly from the barrier.

15 Claims, 5 Drawing Sheets

FIG. 6

UPFLOW CLARIFIER

CROSS REFERENCE TO RELATED APPLICATION

This is a continuation of U.S. patent application Ser. No. 08/448,653, filed May 24, 1995, titled "Upflow Clarifier" and assigned to the assignee hereof, now U.S. Pat. No. 5,569,381.

TECHNICAL FIELD

This invention relates to devices for separating particulate matter from liquids.

BACKGROUND OF THE INVENTION

Many known filtering devices are used to separate particulate matter from liquids. A need for filtering devices exists in many different industries and environments. Filtering devices are commonly made to separate a wide range of particle sizes from liquid and are manufactured to meet almost any specific application.

A universal problem with respect to filtering devices relates to clogging of or accumulation of particulate matter on the filter media. Typical methods for removing the accumulated particulate matter from the filter media include physically removing the particulate matter, and backflushing the filter media by introducing a reverse flow through the filter.

In spite of these known methods, there remains a need to prevent the accumulation of particulate matter on the filter media, particularly during the filtration process, and thereby reduce the frequency of clogging and obstruction of flow through the filter media. It is highly time consuming and inefficient to either backflush the filtering device or physically remove particulate matter from the filter media each time an excess accumulation of particulate matter occurs. Traditional filtering mechanisms have yet to provide an adequate solution to this common problem.

Yet another problem with respect to traditional filtering devices is that, in high volume applications having large filter elements, the filter elements can be either heavy or cumbersome to move or handle if it is desired to replace them or remove them for cleaning. Accordingly, there is a need to provide a filtering device wherein the filter means can be quickly and readily changed so that a variety of particle sizes can be separated from the liquid.

Still another problem with respect to certain traditional settling filters is that the flow of liquid within the enclosure creates turbulence which works against separation of particulate matter by gravity. There remains a need to harness the turbulence of the liquid and to impede upward flow of particulate matter.

Other features and advantages of the present invention will become apparent from the following detailed description, drawings, and claims.

BRIEF DESCRIPTION OF THE DRAWINGS

Preferred embodiments of the invention are described below with reference to the accompanying drawings, which are briefly described below.

FIG. 1 is a sectional side elevational view of a liquid clarifier embodying the invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Shown in the various figures is a liquid clarifier 10 which embodies the invention, and in which liquids having suspended particulate matter are introduced for the purpose of separating the particles. The liquid clarifier 10 can be used in any number of specific applications, such as for treating storm water runoff. The liquid clarifier can also be used for separating heavy metals, shavings, and the like from liquid. The liquid clarifier can also be used in boat yards to separate and contain materials that have washed off the bottom of boats. The liquid clarifier can be used in conjunction with sumps in utility applications, at vehicle wash stations to separate particulate contamination from the wash water, in mining applications to remove debris and particulate matter from wastewater in mines, and many other applications.

The clarifier 10 includes an enclosure 20, and a main inlet 12. In the illustrated embodiment, the main inlet 12 is defined by an inlet pipe 11 extending into the enclosure 20. The main inlet 12 provides for introduction of liquids into the clarifier. The clarifier 10 further includes a main outlet 14 provided at a location upward of the inlet 12 so that the flow of liquid is generally from a lower to a higher elevation. The outlet 14 allows filtered liquid to pass outside of the enclosure 20. The clarifier 10 further includes a drain 16 located at the bottom of the enclosure 10 for removing sludge, and other particulate matter that has settled out by gravity, from the liquid.

The enclosure 20 includes a wall 21 in the shape of a hollow vertical cylinder having an open upper end 23. The enclosure 20 further includes a conical base portion 30 extending downwardly from the wall 21 of the enclosure 20. The conical base portion 30 is in the form of an inverted apex with the walls of base portion 30 converging to a bottom point. The conical base portion 30 concentrates sludge 54 (FIG. 6) settling out by gravity from the liquid within the enclosure 20. The sludge 54 is removed from the enclosure 20 via drain 16. A plurality of supports 46 are attached to the enclosure 20, and support the liquid clarifier 10 from the ground.

The clarifier 10 includes a removable lid 37 closing the open upper end 23 of the enclosure 20. The lid 37 serves to provide quick and easy access into the enclosure, yet prevents impurities from entering into the liquid that has passed upwardly through the filter membranes 68. One of the primary reasons for quick, easy access is to allow the filter membranes 68 to be replaced or serviced. The size of the lid is complimentary to the size of the enclosure 20 such that the lid fits securely about the periphery of the enclosure 20. The weight of the lid 37, alone, is generally sufficient to hold the lid 37 in place because only a small amount of pressure is needed to cause liquid to flow through the clarifier. Liquid will flow out of the outlet creating any significant upward pressure on the lid 37.

The clarifier 10 further includes a horizontal barrier 60 below the open upper end 23 and above the inlet 12. The barrier 60 defines an upper compartment 62 above the barrier 60 and below the lid 37, and a lower compartment 63 below the barrier 60. The barrier 60 has a plurality of apertures 64 therethrough which permit liquid flow from below the barrier 60 into the upper compartment 62. The clarifier 10 further includes cage structures 66 extending upwardly from each aperture 64. The clarifier 10 further includes filter membranes 68 respectively mounted on the cage structures 66. The cage structure 66 and the filter membranes 68 prevent liquid from flowing from the lower compartment 63 to the main outlet 14 without first passing through the filter membranes 68. In the illustrated embodiment, the filter membranes 68 are felt or polypropelyne. A plurality of filter membranes 68 are provided, instead of a single filter membrane, to make removal and installation less cumbersome in large volume applications. In large volume applications, if only a single filter membrane were used, the filter element would be large, and therefore heavy or cumbersome.

The filtering ability of the filter membranes 68, in terms of particle size, can vary depending upon the specific use for which it is intended. Typical applications involve membranes that can filter anywhere from two to twenty microns. In a more preferred embodiment, membranes are provided that can filter anywhere from five to fifteen microns. The filter membranes 68 can be easily exchanged with other filter membranes 68 for separating different size particles.

In the embodiment shown in FIG. 1, the cage structures 66 are generally cylindrical, and, after the filter membranes 68 are mounted on the cage structures 66, the filter membranes 68 are respectively in the shape of an upwardly extending cylinder having a closed top and an open bottom.

Figure 2:
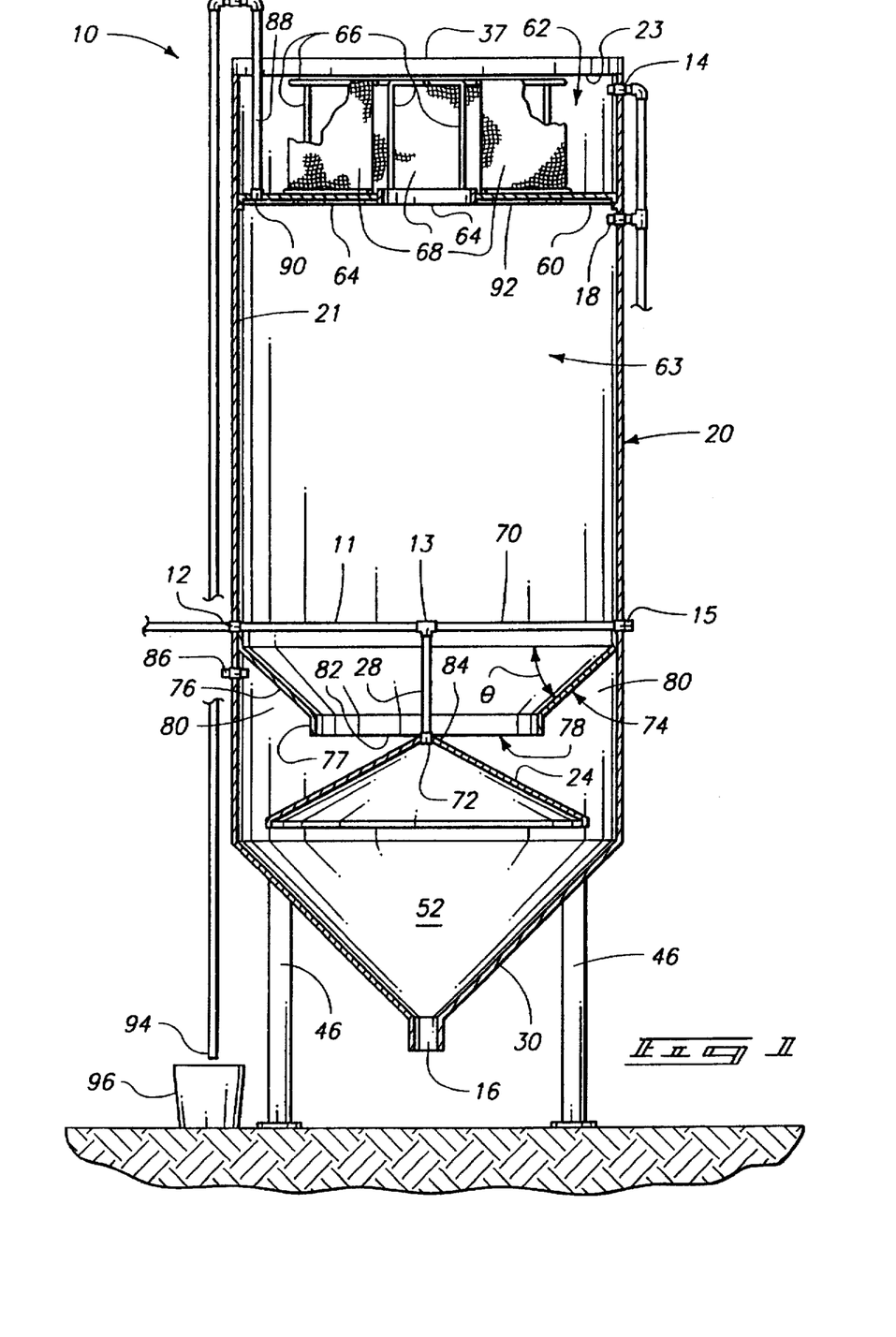
FIG. 2 is a sectional side elevational view of an alternative liquid clarifier embodying the invention.

FIG. 2 is an alternative embodiment which includes features common to the embodiment shown in FIG. 1, like reference numerals indicating like components, except that cage structures 166 include conical upper portions 100. After filter membranes 168 are mounted on the cage structures 166, the filter membranes 168 respectively include the shape of an upwardly extending cone having a closed top and an open bottom, and having an upwardly pointing apex. This design combines the advantage of having many filter elements with the advantages of using a conical filter membrane described in U.S. Pat. No. 5,277,806 to Kuntz, which is incorporated herein by reference.

The clarifier 10 includes a decanting pipe 18, located just below the main outlet 14, which can be used to drain liquid in the upper compartment 62 to the outside of enclosure 20 to allow access to the filter membranes 68. The filter membranes can then be inspected, removed and replaced, or cleaned. For example, the lid 37 is periodically removed so that the filter membranes 68 can be hosed down from above to separate the particulate matter from the membranes 68. The particulate matter will then fall toward the bottom of the clarifier for removal through the drain 16. During the cleaning process, the main outlet 14 is closed, the inlet pipe 12 is closed, and the drain 16 is opened.

The clarifier 10 further includes a tee intersection 13 having opposite ends extending along a diameter of the cylindrical wall 21. The tee intersection 13 is located at the diametrical center of the enclosure 20. The inlet pipe 11 passes through the enclosure 20 and is coupled to one of the ends of the tee intersection 13. In the illustrated embodiment, the clarifier 10 further includes a second pipe 70, coaxial with the pipe 11, which passes through the enclosure 20. The second pipe 70 has one end which is coupled to the tee intersection 13, and another end outside the enclosure 20. The clarifier 10 includes a pipe cap 125 which caps the outside end of the pipe 70. A user can use whichever pipe is more convenient, either pipe 11 or pipe 70, to introduce liquid into the clarifier 10 for treatment, and can cap the other pipe. Alternatively, a user can use both pipes 11 and 70 at the same time.

Extending downwardly from the tee intersection 13 is a pipe 28 having an orifice 72 through which liquid entering into the clarifier will flow. In alternative embodiments, the pipe 28 is omitted.

Figure 3:
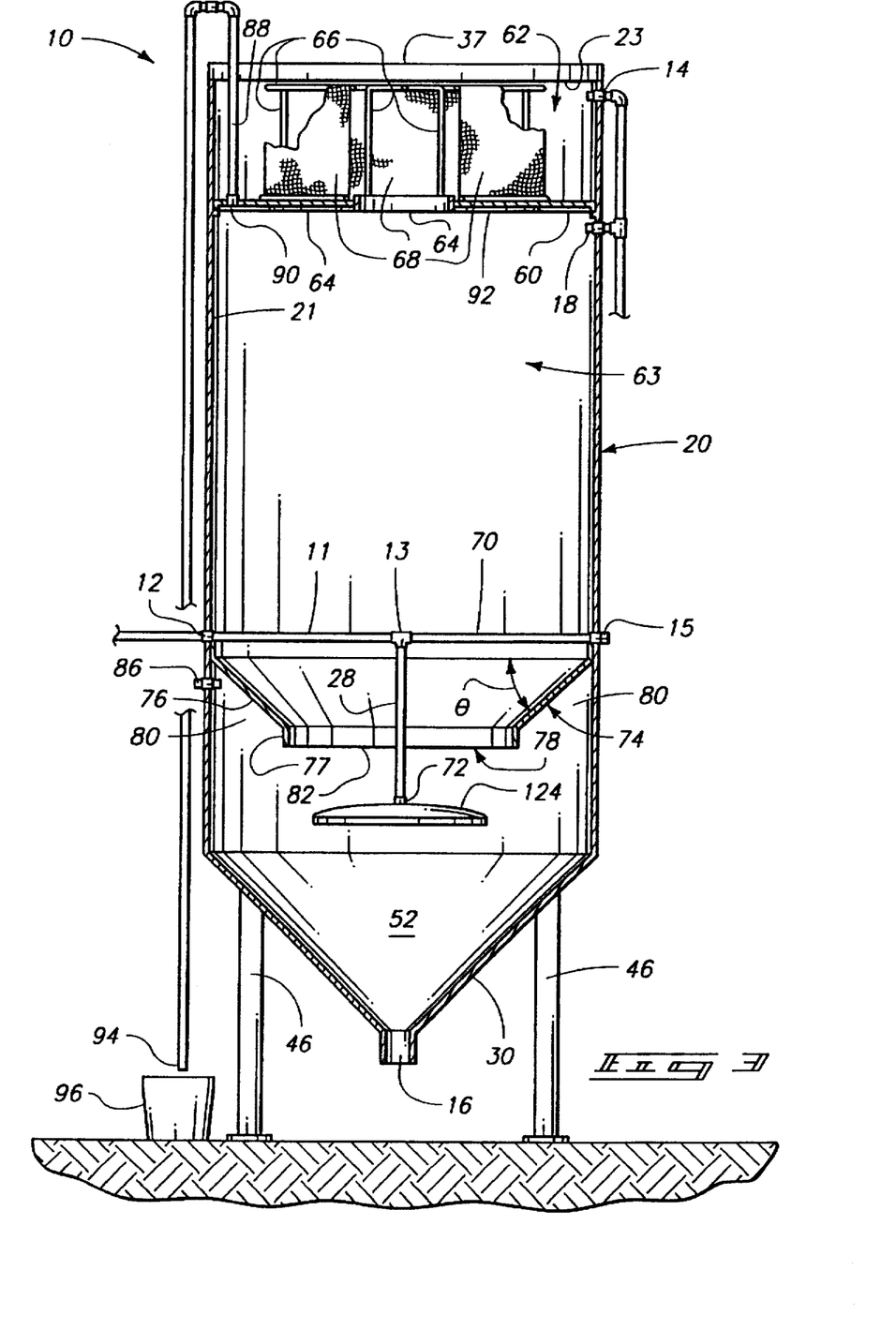
FIG. 3 is a sectional side elevational view of an alternative liquid clarifier embodying the invention.
Figure 4:
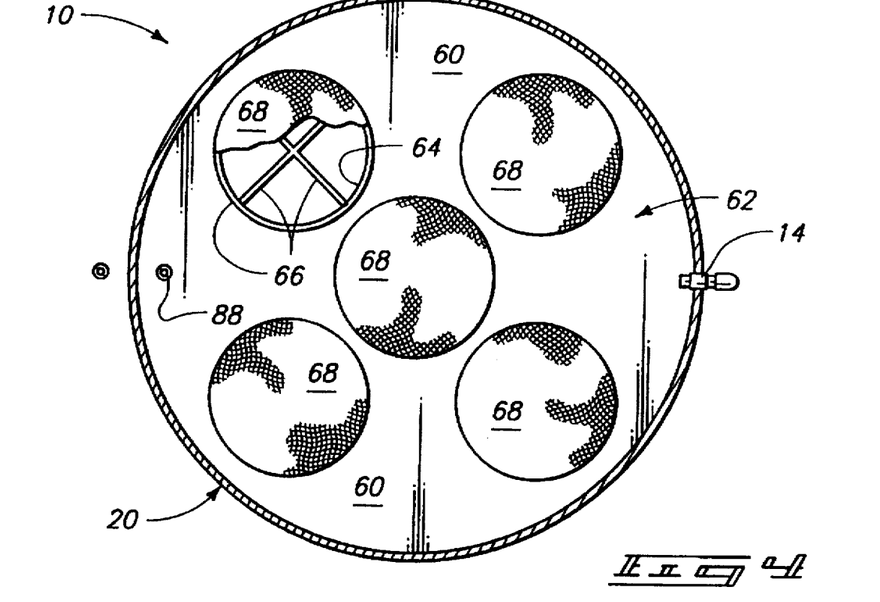
FIG. 4 is a top plan view of the liquid clarifier of FIG. 1.

Coupled about the orifice 72 is a baffle 24 which extends radially outwardly and downwardly from the pipe 28. The baffle 24 extends toward the wall 21 but does not, however, contact the wall 21. This provides a peripheral area around the baffle for allowing liquid to flow upwardly around the baffle 24 toward the filter membranes 68 and the outlet 14. The spacing distance between the edge of the baffle 24 and the wall of the enclosure 20 will vary depending upon the solution being filtered. The baffle 24 provides a hood around which the liquid must flow. This promotes settling of most of the heavy particles before the liquid starts to flow upwardly. In the preferred embodiment, the baffle 24 has a conical shape, which has been found to be the best shape to promote settling. However, alternatively shaped baffles can be employed. FIG. 3 shows an alternative embodiment having features in common with the embodiment of FIG. 1, with like reference numerals indicating like components. In the embodiment of FIG. 3, a baffle 124 is employed which is in the general shape of a downwardly facing dish.

The clarifier 10 optionally further includes a particulate restriction member 74. The particulate restriction member 74 includes a frusto-conical wall 76 extending downwardly and inwardly from the cylindrical wall 21, and a central aperture 78 having a diameter less than the diameter of the cylindrical wall 21. In one embodiment, the wall 76 is at an angle θ no less than 40° so that any material that settles on the wall 76 will fall off the wall 76 under the force of gravity.

Liquid entering the clarifier 10 may include particulate matter such as free gains of sand, large granular material, suspended solids, or other particulate material. Turbulence caused by the entry of liquid into the clarifier 10 results in the particulate matter being caught in the area 80 radially between the wall 76 and the wall 21 of the enclosure 20, below the wall 76 and above the aperture 78. Flow into the clarifier 10 is periodically stopped, and during these periods, the particulate matter settles to the base portion 30 where it can be pumped out with collected sludge 54. The particulate restriction member 74 delays upward travel of the particulate matter for a sufficiently long time that the particulate matter becomes attached to flocculated matter so as to be more likely to fall to the conical base portion 30 when flow into the clarifier 10 is stopped.

It has been found that as the angle θ is reduced, there is less pressure on liquid travelling upwardly, and less particulate matter is likely to be prevented from travelling upwardly through the aperture 78. The angle θ can be increased.

The particulate restriction member 74 optionally further includes a annular lip 77, in the shape of a hollow cylinder, extending downwardly from the frusto-conical wall 76. The annular lip 77 increases the amount of surface area restricting upward movement of particulate matter. In the illustrated embodiment, the bottom 82 of annular lip 77 is even with or below the top 84 of the baffle 24.

Optionally, a fitting 86 is provided in fluid communication with the area 80. A pressure regulator (not shown) is attached to the fitting 86 at an area outside the enclosure 20, and is used to regulate or remove air that might be trapped in the area 80.

The clarifier 10 further includes means for detecting if the filter membranes are clogged. More particularly, the detecting means comprises a pipe 88 having an inlet 90 in fluid communication with the top 92 of the lower compartment, and having an outlet 94 outside the enclosure 20. The outlet 94 leads to a bucket or container 96. More particularly, an aperture is provided through the barrier 60, a fitting is coupled to the aperture, and the inlet 90 is attached to the fitting so that the inlet 90 is in fluid communication with the lower compartment 63, but is sealed against fluid communication with the upper compartment 62. If the filter membranes are clogged, pressure will rise in the lower compartment 63. Water will rise inside the filter membranes 68 to a level above the outlet 14. Liquid will flow through the pipe 88 into the bucket 96. The pipe 88 extends upwardly a sufficient distance so that a pre-determined pressure must develop within the lower compartment before liquid will flow into the bucket 96. In one embodiment, the pipe 88 extends vertically approximately one foot above the lid 37. In this embodiment, liquid will not flow into the bucket 96 until at least one-half pound of pressure is developed in the lower compartment 63. The liquid channeled into the bucket provides a visual and audible indication that the filter membranes are clogged.

While other materials could be employed, in the illustrated embodiment, the enclosure 20, baffle 24, base portion 30, barrier 60, edge structures 66, and particulate restriction member 74 are formed of stainless steel, and are welded together to form the illustrated clarifier 10. Other materials can be used depending on the character of the liquid being treated.

While the clarifier 10 can include various dimensions and dimensional relationships, in the embodiment illustrated in FIG. 2, the cylindrical wall 21 has a diameter of 84 inches, and a height (from the open upper end 23 to the conical base portion 30) of 192 inches; the conical base portion 30 has a height of 34 inches; the upper compartment 61 has a height (below the open upper end 23) of 22 inches; the bottom 82 of the particulate restriction member 74 is aligned with the top of the baffle 24; and the bottom of the baffle 24 is 2 inches above the top of the conical base portion 30. Other dimensions can be employed.

Figure 5:
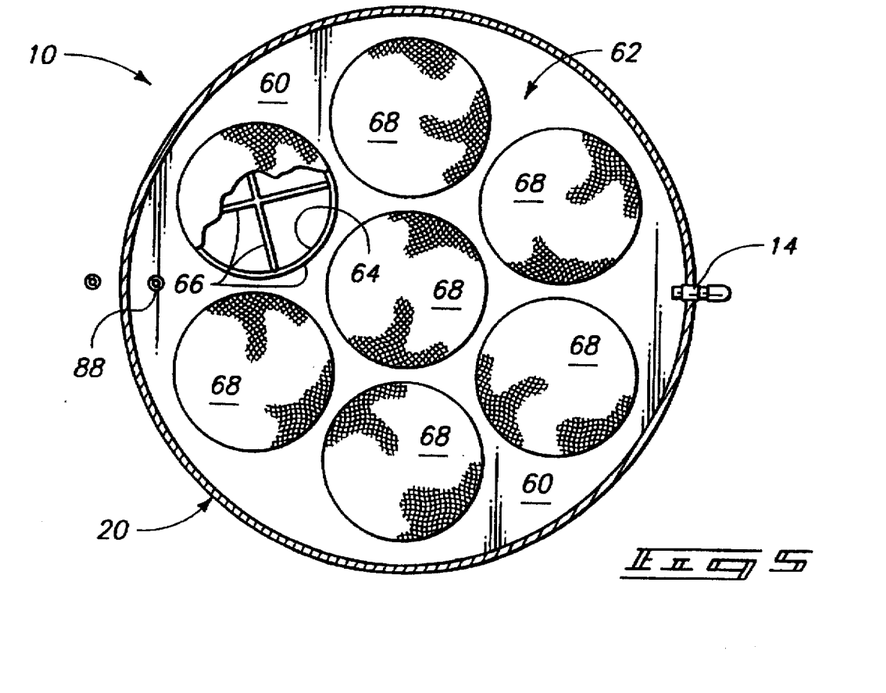
FIG. 5 is a top plan view of an alternative liquid clarifier embodying the invention.

FIG. 5 illustrates that different numbers of filter membranes 68 or 168 can be employed in different embodiments.

In operation, the liquid is introduced into the liquid clarifier 10 through the inlet pipe 12. The liquid is under a small amount of pressure (e.g., 2 to 3 lbs.) which allows the liquid to fill the enclosure. After passing through the membranes 68, the liquid passes by gravity through outlet 14 to the outside of the clarifier. In one embodiment, between five and fifty gallons per minute are introduced into the clarifier 10 through the inlet.

Figure 6:
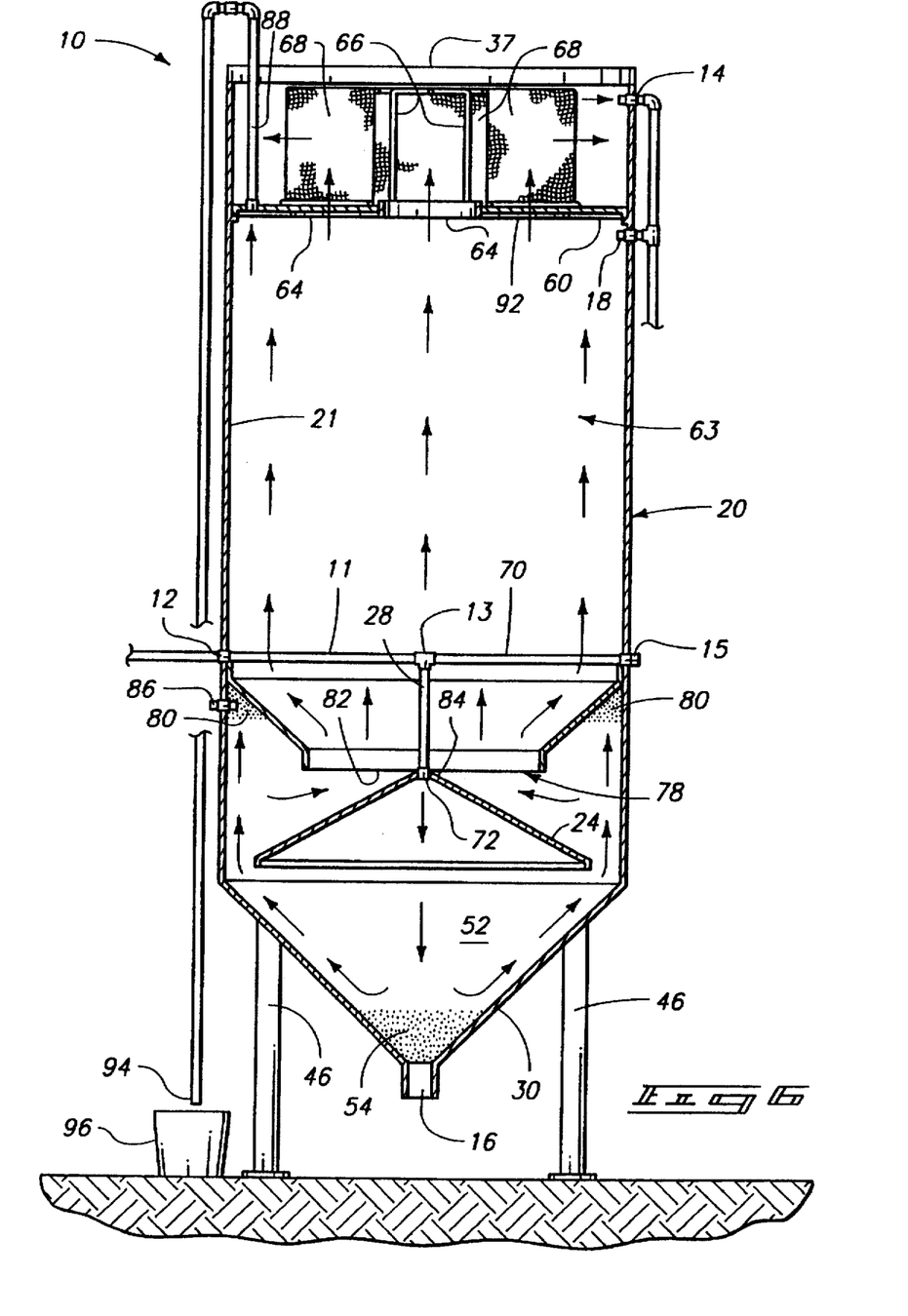
FIG. 6 is a sectional side elevation view of the clarifier of FIG. 1 showing the directions of flow of the liquid within the clarifier.

With reference to FIG. 6, the various flows of the liquid within the clarifier are shown. Initially, liquid is allowed to enter into the clarifier 10 by means of inlet pipe 12. The liquid passes through the tee intersection 13 and downwardly through inlet pipe 28. The baffle 24 provides a hood around which the liquid must flow. This promotes settling of most of the heavy particles before the liquid starts to flow upwardly.

Turbulence caused by the entry of liquid into the clarifier 10 results in other particulate matter being caught in the area 80, while other liquid flows upwardly through the central aperture 78.

After the liquid has passed through the central aperture 78, the liquid flows upwardly through enclosure 20 until it encounters the filter membranes 68. The liquid filters through the membranes 68 and passes in a purified state through the outlet 14. The particles which do not pass through membranes 68, eventually either fall back down toward the bottom of the enclosure 20 to form sludge 54, or accumulate on the inner/under side of membranes 68.

In the embodiment of FIG. 2, where the filter membranes include a conical shape, the flow of the liquid across the membranes causes a sweeping action which causes the particles to break loose from the filter membranes and creates a self-cleaning effect. The sweeping flow of liquid is repeated from the recirculation of the liquid after it has passed over the inside surface of membranes 68. This circulation of the liquid allows the liquid to pass along debris and particles that have collected in the membranes and break them loose so they can settle out as sludge 54 in settling chamber 52 of the clarifier 10. Only completely filtered liquid is allowed to pass upwardly through the membranes 68 into the upper compartment 62. To enhance the effect of the sweeping action of the liquid to "self-clean" the filter membrane, and to provide an opportunity for the particulate matter in area 80 to settle, the liquid may be intermittently introduced into the enclosure through the inlet. The intermittent introduction of liquid into the enclosure 20 can be accomplished by any conventional means. For example, the clarifier 10 could be used in conjunction with a sump pump which operates only when necessary to introduce liquid from an outside source into the clarifier 10 for clarifying. The sporadic flow of liquid from the sump pump to the inlet 12 varies the turbulence of the liquid within the tank and the speed at which the liquid sweeps across the filter membranes 68. This enhances separation of the particulate matter from filter membranes 68 by allowing the particulate matter to fall by gravity toward the bottom of the enclosure 20 when the sweeping speed of the liquid across the filter membranes 68 is reduced. The upflow of liquid through the filter membrane, the sweeping action of the liquid across the filter membrane, and the intermittent flow of liquid into the clarifier advantageously create a self-cleaning effect that allows the clarifier to operate for extended hours and require less periodic maintenance.

In compliance with the statute, the invention has been described in language more or less specific as to methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. An upflow clarifier comprising:

an enclosure defining a bounded volume for holding liquid;

an inlet coupled to said enclosure;

an outlet coupled to the enclosure above said inlet;

a barrier in said enclosure, between said inlet and said outlet, said barrier having a plurality of apertures therethrough, and said barrier defining an upper compartment above said barrier and a lower compartment below said barrier;

a plurality of filter membranes respectively mounted to said apertures, wherein liquid flowing through said apertures flows through said filter membranes, said filter membranes extending upwardly from said barrier; and a particulate restriction member above said inlet and below said barrier.

2. An upflow clarifier in accordance with claim 1 wherein said filter membranes respectively include a cylindrical shape having an open bottom end in communication with one of said apertures and having a closed top end above said open end.

3. An upflow clarifier in accordance with claim 1 wherein said filter membranes respectively include a conical shape having an upwardly pointing apex and having an open bottom end in communication with one of said apertures.

4. An upflow clarifier in accordance with claim 1 wherein said filter membranes respectively include a conical shape having an apex, wherein said filter membranes respectively include walls sloping downwardly from the apex and terminating in respective annular bases, wherein the bases of the membranes are respectively mounted to the apertures, and wherein liquid passes upwardly to sweep across said membranes to free particulate matter from said membranes and prevent particulate matter from building up on said membranes.

5. An upflow clarifier in accordance with claim 1 wherein said filter membranes respectively include a conical shape having an apex, wherein said filter membranes respectively include walls sloping downwardly from the apex and terminating in respective annular bases, wherein the bases of the membranes are respectively mounted to the apertures, wherein liquid passes upwardly to sweep across said membranes to free particulate matter from said membranes and prevent particulate matter from building up on said membranes, and wherein liquid is intermittently introduced into the enclosure through the inlet to vary the turbulence of the liquid within the tank to enhance separation of the particulate matter by allowing particulate matter to fall from the filter membranes by gravity toward the bottom of the enclosure.

6. An upflow clarifier in accordance with claim 1 wherein said enclosure comprises a cylindrical wall, said clarifier further comprising a conical baffle having a narrowed end and an enlarged end, said narrowed end being in fluid communication with said inlet, said enlarged end extending downward and radially outwardly from said narrowed end, said enlarged end spaced from said cylindrical wall of said enclosure to allow liquid entering into the enclosure through said inlet to pass upwardly between said enlarged end and said cylindrical wall, said baffle reducing the turbulence of the liquid within portions of the enclosure to promote separation of particulate matter by gravity.

7. An upflow clarifier in accordance with claim 1 wherein the enclosure comprises a cylindrical wall, the clarifier further comprising a downwardly directed baffle in fluid communication with said inlet, and wherein said particulate restriction member includes a frusto-conical wall extending downwardly and inwardly from the cylindrical wall and a central aperture having a diameter less than the diameter of the cylindrical wall.

8. An upflow clarifier in accordance with claim 1 wherein the enclosure comprises a cylindrical wall, wherein the clarifier further comprises a downwardly directed baffle in fluid communication with said inlet, wherein said particulate restriction member is located above said baffle and below said barrier, wherein said particulate restriction member includes a frusto-conical wall extending downwardly and inwardly from the cylindrical wall and a central aperture having a diameter less than the diameter of the cylindrical wall, and wherein the frusto-conical wall has an angle of between 45° and 60° down from horizontal.

9. An upflow clarifier in accordance with claim 1 wherein the enclosure comprises a cylindrical wall, wherein the clarifier further comprises a downwardly directed baffle in fluid communication with said inlet, wherein said particulate restriction member includes a frusto-conical wall extending downwardly and inwardly from the cylindrical wall and a central aperture having a diameter less than the diameter of the cylindrical wall, and wherein the clarifier further comprises a fitting in fluid communication with an area below the frusto-conical wall and above said baffle and used to remove air that might be trapped in that area.

10. An upflow clarifier in accordance with claim 1 wherein the enclosure comprises a cylindrical wall, wherein the clarifier further comprises a downwardly directed baffle in fluid communication with said inlet, wherein said particulate restriction member includes a frusto-conical wall extending downwardly and inwardly from the cylindrical wall and a central aperture having a diameter less than the diameter of the cylindrical wall, and wherein said particulate restriction member further includes an annular lip, in the shape of a hollow cylinder, extending downwardly from the frusto-conical wall.

11. An upflow clarifier in accordance with claim 1 and further comprising means exterior of the enclosure for indicating if the filter membranes are clogged.

12. An upflow clarifier in accordance with claim 1 and further comprising a pipe having an inlet in fluid communication with said lower compartment, and having an outlet outside the enclosure, and a container in fluid communication with said outlet of said pipe.

13. An upflow clarifier comprising:

an enclosure including a wall defining a bounded volume for holding liquid;

an inlet coupled to said enclosure;

an outlet coupled to the enclosure above said inlet;

a barrier in said enclosure, between said inlet and said outlet, said barrier having a plurality of apertures therethrough, and said barrier defining an upper compartment above said barrier and a lower compartment below said barrier;

a plurality of filter membranes respectively mounted to said apertures, wherein liquid flowing through said apertures flows through said filter membranes, said filter membranes extending upwardly from said barrier; and a particulate restriction member above said inlet and below said barrier, said particulate restriction member including a frusto-conical wall extending downwardly and inwardly from the enclosure wall and including a central aperture having a diameter less than the diameter of the cylindrical wall.

14. An upflow clarifier in accordance with claim 13 wherein the filter membranes are cylindrical filter membranes having open bottoms and closed tops.

15. An upflow clarifier in accordance with claim 14 and further comprising means exterior of the enclosure for indicating if the filter membranes are clogged, said indicating means including a pipe having an inlet in fluid communication with said lower compartment, and having an outlet outside the enclosure, and a bucket in fluid communication with said outlet of said pipe.

* * * * *

UNITED STATES PATENT AND TRADEMARK OFFICE
CERTIFICATE OF CORRECTION

PATENT NO. : 5,676,834
DATED : October 14, 1997
INVENTOR(S) : James Kuntz

It is certified that error appears in the above-identified patent and that said Letters Patent is hereby corrected as shown below:

Column 2, line 64, after "outlet" insert --14 prior to--.

Column 4, line 1, replace "pipe cap 125" with --pipe cap 15--.

Signed and Sealed this

Third Day of March, 1998

Attest:

BRUCE LEHMAN

*Attesting Officer*  *Commissioner of Patents and Trademarks*